United States Patent
Meyer

(10) Patent No.: US 9,383,289 B1
(45) Date of Patent: Jul. 5, 2016

(54) WATER LEAK DETECTION SYSTEM

(71) Applicant: John Meyer, Pompano Beach, FL (US)

(72) Inventor: John Meyer, Pompano Beach, FL (US)

( * ) Notice: Subject to any disclaimer, the term of this patent is extended or adjusted under 35 U.S.C. 154(b) by 0 days.

(21) Appl. No.: 14/584,711

(22) Filed: Dec. 29, 2014

Related U.S. Application Data

(63) Continuation-in-part of application No. 13/542,226, filed on Jul. 5, 2012, now Pat. No. 8,922,379.

(60) Provisional application No. 61/504,614, filed on Jul. 5, 2011.

(51) Int. Cl.
*G08B 21/00* (2006.01)
*G01M 3/16* (2006.01)
*G08B 21/18* (2006.01)
*G08B 1/00* (2006.01)
*H04L 1/00* (2006.01)

(52) U.S. Cl.
CPC ............ *G01M 3/16* (2013.01); *G08B 21/18* (2013.01); *G08B 1/00* (2013.01); *H04L 1/00* (2013.01)

(58) Field of Classification Search
CPC ................................. G08B 1/00; H04L 1/00
See application file for complete search history.

(56) References Cited

U.S. PATENT DOCUMENTS

| | | | |
|---|---|---|---|
| 2002/0070846 A1* | 6/2002 | Bastian, II | G06F 3/147 340/5.92 |
| 2010/0114386 A1* | 5/2010 | Fima | E03B 1/00 700/276 |
| 2010/0188206 A1* | 7/2010 | Kates | G08B 19/00 340/521 |

OTHER PUBLICATIONS

Watersafe http://www.thewatersafe.com/products_watersafe.htm Discovered Oct. 1, 2012.
Waterlarm http://waterlarm.com/ Discoverd Aug. 14, 2012.

* cited by examiner

*Primary Examiner* — Shirley Lu
(74) *Attorney, Agent, or Firm* — H. John Rizvi; Gold & Rizvi, P.A.

(57) ABSTRACT

The present invention provides a water leak detection system for detecting water leaks in residential and commercial buildings or constructions. The water leak detection system provides central monitoring and point identification data of water leaks. The water detection system includes a plurality of address modules connected to a plurality of sensors for assigning an identifier to each sensor. The address modules are in wired or wireless communication with a central control unit, which processes detected sensor signals and notifies an alarm annunciator of point identification data of a water leak. The alarm annunciator provides visual and/or audible indications of where a water leak has been detected. The central control unit and/or alarm annunciator further operate a valve associated to the sensor in order to revert the water leak detection. The central control unit can further communicate the detection to a remote equipment, via a wired or wireless network communication.

20 Claims, 3 Drawing Sheets

WATER LEAK DETECTION SYSTEM

CROSS-REFERENCE TO RELATED APPLICATION

This Non-Provisional Utility application claims the benefit of U.S. Provisional Patent Application Ser. No. 61/504,614, filed on Jul. 5, 2011, which is incorporated herein in its entirety.

FIELD OF THE INVENTION

The present invention relates generally to detection systems, and more particularly, to a water leak detection system for detecting, monitoring and ceasing water leaks throughout residential or commercial buildings, and for providing visual and audible warnings of water leaks.

BACKGROUND OF THE INVENTION

Undetected water leaks in residential and commercial buildings can lead to extensive water damage to building structure. The cost of repairing the damage can extend well into the thousands of dollars if the water leaks are not detected in a timely manner. Because water leaks often occur out of sight and in discrete places like in walls, attics, behind cabinets, under floors, under appliances, or basements, accumulated water is often the only indication that a water leak is present. Undetected water leaks can also pose a health risk to occupants. Unresolved water leaks lead to the growth of hazardous mold, mildew, and fungus that can spread quickly to surrounding areas. Water leaks typically occur from a diversity of water sources including home appliances such as washing machines, dishwashers, water coolers, and dehumidifiers. Other sources of water leaks include leaking water pipes, faucets, hot water heaters, in-line water filters, and valves. Accumulated moisture or condensation generated from air conditioners or ventilation units can also be indicative of water leaks and thus, detecting moisture and condensation is also beneficial in water leak detection applications. Water leaks are often the result of aging appliances, deteriorating solder joints, improper piping or equipment installations, corrosion, or high-pressure water sources that impact joints and connections.

Property owners and businesses generally insure themselves against the possible damage due to water leaks; however, the sky rocketing costs of insurance premiums pose more of a challenge to owners having larger, residential or commercial buildings. Water leaks are particularly undesirable in residential dwellings and commercial buildings involving a large number of residential units, apartments, or offices. An undetected water leak in one apartment or office can quickly spread causing considerable damage to adjacent areas. Particularly in large residential buildings, often a number of residents are away on business, vacationing, or visiting family and friends, thereby leaving their apartment or condo unoccupied for days. Also, workers occupying commercial buildings typically retire for the day leaving their offices unoccupied at night. Any undetected water leaks can quickly flow through the walls, floors or ceilings of unoccupied areas and seep into adjacent areas, further damaging neighboring building structure, and expensive office equipment.

Central heating, ventilation, and air conditioning systems include chillers. The chillers are generally located at an elevated location within or atop of a structure. Larger chillers are commonly cooled by flowing fluid or water therethrough. The fluid/water is fed into and from the chiller using high-pressure piping. One potential concern would be a water leak within the piping structure.

The clean-up costs associated with water leaks are often proportional to the amount of water that has accumulated over time. It typically costs more to remove a larger amount of water because the mass of water must be pumped out and completely removed from the localized area before any drying; repairing or reconstruction can be initiated. Response time is vital in implementing remedial measures to correct water leaks. A quick response in addressing water leaks helps mitigate and further prevent costly water damage to equipment, furniture, and to the structural building.

A number of water leak detection devices have been implemented to address the quick response time needed to detect water leaks. Some prior art devices include localized leak detection devices that are situated throughout various locations within a building to alert the presence of water. Such devices typically include a small housing enclosing both a water sensor and audible alarm. One drawback of such devices is that an individual observer must be in arms-length from the detecting device to hear the audible alarm, thus making it impractical for remotely monitoring water leaks. Other devices or systems include well-known closed-circuit type detectors including a receptacle for housing solid-state circuitry that is coupled to one or more sensors where the sensors include two probes or connectors. When water flows onto the probes or conductors, a closed electrical path is provided to produce an alert signal. Such devices make it extremely difficult to detect small amounts of water or moisture, and generally provide no point data indication, including the locations where the sensors are situated throughout the building.

More sophisticated water leak detection systems have been designed to meet the ongoing needs of efficiently monitoring and detecting water leaks. Such automated water detection systems generally include a controller having a number of status indicators, and a plurality of water detection sensors electrically connected to the controller. The status indicators generally include a plurality of light emitting diodes or LED segment blocks that provide a visual indication of the operative location of water sensors. These automated systems suffer a number of drawbacks. One drawback is the number of light emitting diodes needed to represent a larger number of sensors used for in a plurality of locations. For example, an apartment complex having multiple apartments would require a controller to include a numerous amount of status indicators to be able to monitor and detect appliances, pipes, and other water generating devices in each apartment, thus making it impractical, and expensive to construct and implement. Other automated systems incorporate additional monitoring features such as detecting smoke, radon, or carbon monoxide. These systems are expensive, complex, and require a great deal of time to integrate. Thus, conventional automated water leak detection systems are difficult to install, provide limited remote observation of conditions, and are limited in application. The known conventional automated water leak detection systems are not integrated or in continuous communication with into a remote supervised or monitored agency.

Accordingly, there remains in the art a need for a water leak detection system that is easy to install and integrate, provides exact point identification of water leak detection sensors, and is user friendly to operate. There is a further need in the art for a water leak detection system having centralized water detection control in remote communication with a central monitoring agency to provide continuous monitoring, immediate notification, and point identification data of water leaks.

SUMMARY OF THE INVENTION

The present invention provides a water leak detection system that offers centralized water detection, remote station monitoring, and point identification of water leaks. The water detection system includes a plurality of sensors that are situated in a variety of different locations throughout residential or commercial buildings for detecting water leaks or abnormal water presence. A plurality of address modules is electrically interfaced between the sensors and a central control unit for assigning an identifier to each sensor. A central monitoring station includes an alarm annunciator for providing visual and audible indications of water leaks.

In accordance with a preferred aspect of the present invention, there is provided a water leak detection system comprising a central control unit, a plurality of address modules electrically communicated with the central control, a plurality of sensors, each sensor being electrically communicated with an address module which in turn assigns an identifier to each sensor, and an annunciator electrically in electrical communication with the central control unit, where the annunciator displays point identification data of each sensor.

Preferably, the plurality of sensors includes any one of water sensor, moisture sensor, humidity sensor, or floatation sensor, and can further include a temperature sensor, a gas sensor, a pressure sensor, a smoke sensor, to name a few. The point identification data of each sensor includes location of sensor and monitored status condition of each sensor.

In another aspect of the present invention, the water sensors are preferably located in key locations. Several exemplary key locations include adjacent to water storage tanks, primary water conduits, lower lying regions respective to the floor level such as edges or corners with the structure, elevator pits, stairwell, and the like. Additionally, the water or fluid sensors can be located near fuel storage containers and/or fuel transfer conduits (i.e. piping).

In a further aspect of the invention, the central control unit is configured to detect a signal from an address module, the signal being responsive to a positive detection from a sensor associated to the address module. Upon detecting such a signal, he central control unit sends an alarm signal to the alarm annunciator to notify the alarm annunciator of the positive detection by the sensor and to provide point identification data of the sensor that has made the detection. The alarm annunciator, upon receiving the alarm signal, provides a sensory indication via a user interface, the sensory indication communicating the point identification data of the sensor.

In a further aspect of the invention, the central control unit and/or the alarm annunciator can identify at least one valve associated to the sensor that made the positive detection, and send a signal to the at least one valve to cause the valve to operate in order to revert the positive detection made by the sensor.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
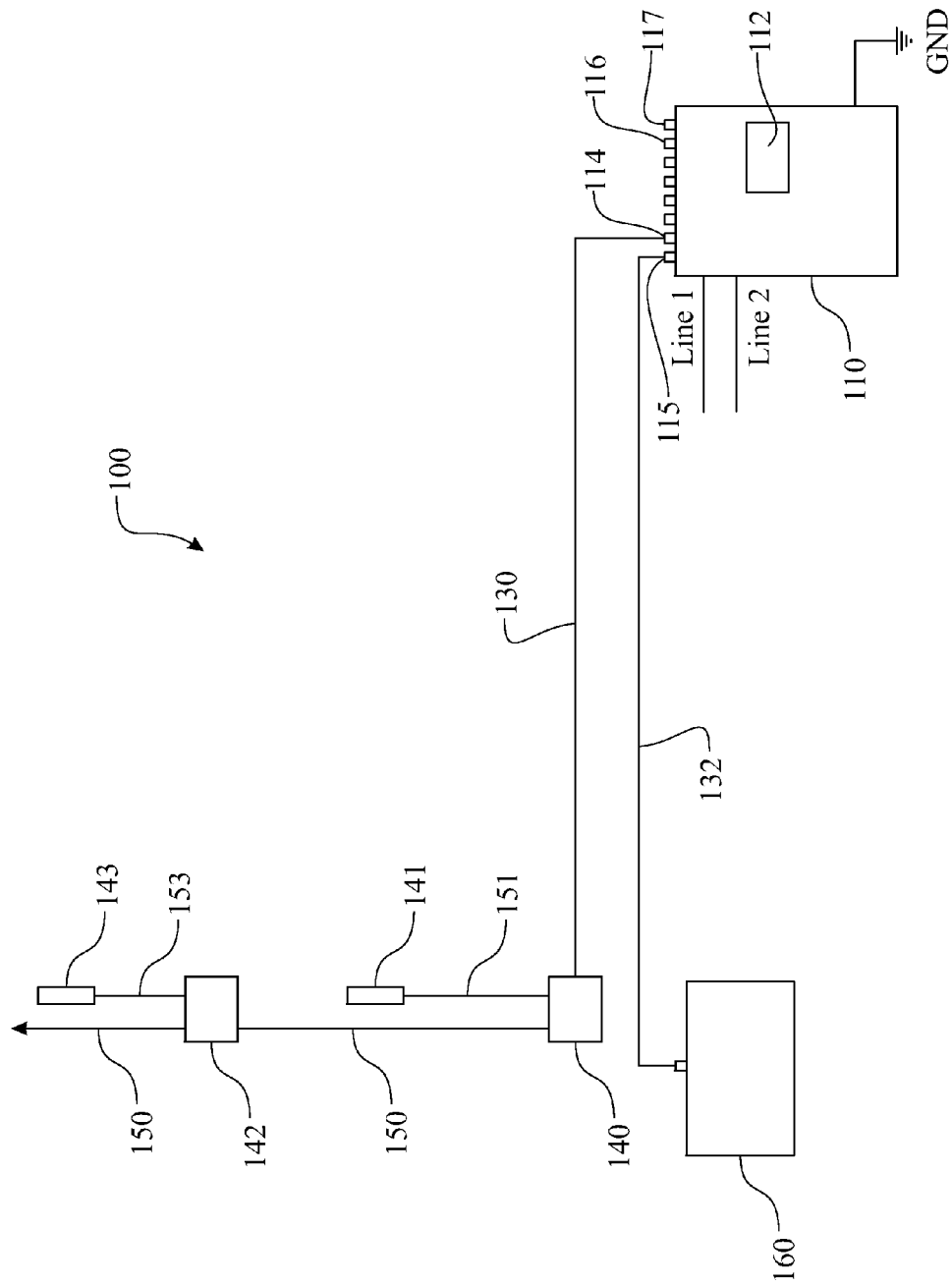
FIG. 1 is a plan view of a water leak detection system, in accordance with an exemplary embodiment of the invention.

Referring now to the drawings, wherein like elements are represented by like numerals throughout, there is shown in FIG. 1 a plan view of a water leak detection system, generally denoted at 100, according to an exemplary embodiment of the present invention. The water leak detection system 100 provides a centralized water leak detection and monitoring system including a central control unit 110, an alarm annunciator 160, a plurality of address modules 140, 142, and a plurality of water-related sensors 141, 143 such as water sensors, moisture sensors, floatation sensors, or humidity sensors. Although, as is illustrated in FIG. 1, the present embodiment depicts two address modules 140, 142 and two sensors 141, 143, it is understood that different embodiments of the present invention may include any number of sensors electrically coupled to any number of address modules. For instance, the number of address modules 140, 142 and sensors 141, 143 implemented in the system can depend on the number of locations or appliances an individual wishes to monitor, and on the number of sensors installed at each location or appliance.

The central control unit 110 and the alarm annunciator 160 of the present embodiment are in electrical signal communication over a wired data line 132, as shown in FIG. 1. However, alternative embodiments are contemplated in which the central control unit 110 and the alarm annunciator 160 communicate wirelessly.

The address modules 140, 142 of the present embodiment are in electrical signal communication with each other over a wired data line 150, and connected to the central control unit also over wired data line 130, which can be the continuation of data line 150 or a separate data line, depending on the specific architecture. Alternative embodiments are contemplated in which each address module 140, 142 may be directly communicated with the central control unit 110 over a respective, dedicated data line. Further embodiments are contemplated in which the address modules 140, 142 can communicate wirelessly with the central control unit 110.

In addition, as illustrated in FIG. 1, each sensor 141, 143 is electrically connected to a corresponding address module 140, 142 via a corresponding wired data line 151, 153. Preferably, the wired data lines 151, 153 are insulated to prevent damage to the wires, and electrically shielded to reduce or prevent any electrical interference. In alternative embodiments, the sensors 141, 143 may be hard-wired to each address module 140, 142. In further alternative embodiments, the sensors 141, 143 may detachably plug into each corresponding address module 140, 142 making it easy and convenient to replace or repair a sensor, if needed.

In summary, one of ordinary skill in the art will understand that wireless communications, wired communications, hard-wired connections or a combination thereof, may be used to establish any of the electrical signal communications between the central control unit 110, the address modules 140, 142 and the sensors 141, 143. Communications are preferably bi-directional; however, alternative embodiments are contemplated where bi-directionality does not apply or is not needed. Wired communications may be provided over USB, Ethernet, serial lines, parallel lines, power lines, phone lines, or any applicable cable and cable-supported protocol. In addition, wired communications may present any applicable network architecture, such as, but not limited to, a bus, a ring, a star, a tree, or a combination thereof. Wireless communications can include, for instance and without limitation, Wi-Fi, Bluetooth, or any other radiofrequency link. The various electrical signal communication alternatives will not be described in further detail so as not to obscure the invention.

The sensors 141, 143 may comprise any well-known water sensors on the market today, such as, but not limited to, wire, metal or foil grids, electrical probes, semiconductor devices or components, plates, or any other suitable elements that are incorporated to detect or sense the slightest presence of water. Moisture sensors can be included, in order to detect the presence of moisture and condensation, as both can be indicative of water leaks. The sensors 141, 143 are placed in locations where water leaks are likely to occur, such as near a sink or toilette, at a pump, under or near household appliances, near drains, along windows, in walls or attics, in basements, along supply or drain pipes, near a fluid containment system, at particular joint connections, under or near an air conditioner, in water collection trays, near appliances, near any part of an air conditioner system, under or near a water heater tank, near a fire sprinkler system, or any possible water generating source that may lead to a water leak. The sensors 141, 143 can also be placed in locations where abnormal presence of water would be particularly undesirable, such as electrical equipment cabinets or rooms, computer rooms, libraries, storage rooms, etc.

The address modules 140, 142 serve as an electrical interface for communication between the plurality of sensors 141, 143 and the central control unit 110. Each address module 140, 142 assigns a unique address or identifier to each individual sensor 141, 143. In certain embodiments, more than one water and moisture sensor can be in signal communication with a common address module, in which case that common address module is configured to assign a different address or identifier to each individual sensor. In turn, each address module 140, 142 is preconfigured to have a different, unique address or alternatively, each address module 140, 142 can be programmed in-situ by an operator, such as via the central control unit 110, and assigned a unique address.

The address modules 140, 142 may be housed in a junction box that is easily accessible. Alternatively, each module 140, 142 may be installed in separate locations throughout various areas within a residence or commercial building. The advantage of storing a plurality of address modules 140, 142 in a single junction box or enclosure is that full and simultaneous access is provided to all address modules 140, 142, thereby facilitating any repair or replacement of modules, if needed. Each address module 140, 142 may comprise a plug-in type module making it easy to replace or repair a faulty module.

With continued reference to FIG. 1, the central control unit 110 includes all the necessary software, programs, databases, and files required for efficiently monitoring water and moisture leaks in the proximity of the system 100. More specifically, the central control unit 110 houses the necessary central controller or processor unit and storage memory (RAM, ROM, programmable ROM, or the like) needed to process data and information. A set or series of machine-executable instructions or programs may be stored on one or more machine readable mediums, such as CD-ROMs or other type of optical disks, floppy diskettes, ROMs, RAM's, EPROM's, EEPROM's, magnetic or optical cards, flash memory, or other types of machine-readable mediums suitable for storing programs, software, or electronic instructions. Alternatively, the methods may be performed by a combination of hardware and software. The functional components are housed within a durable, grounded, metal enclosure that is preferably installed in a dry, accessible area of a residential or commercial building. For example, the central control unit 110 can be installed in a building's electrical room, which is usually well ventilated, and includes a temperature-controlled atmosphere. The enclosure may or may not be waterproof and may include a lockable hinged front cover to prevent unauthorized personnel from entering central control unit 110. The central control unit 110 is generally powered by a suitable AC power supply, e.g. a 110 or 140 V AC power supply. In certain embodiments, the central control unit 110 may include a backup power source configured to provide standalone power, such as, but not limited to, an uninterruptable power supply (commonly referred to as a UPS), a battery, a fuel-powered generator, or any combination thereof, to power the central control unit 110 in the event of an electrical power failure. The backup power supply offers the advantage of continued water leak detection upon power failure.

The central control unit 110 communicates with address modules 140, 142 and processes and produces the identification data of each sensor 141, 143, together with information regarding the sensor status or whether the sensor has detected an incidence. In addition, the central control unit 110 communicates with the alarm annunciator 160 in the event of a water or moisture detection by a sensor 141, 143. In addition, the central control unit 110 can optionally include audible or visual signal emitters, such as, but not limited to, a buzzer, a siren, a speaker, a LED set, or the like, for providing an audible or visual signal when the sensors 141, 143 detect the presence of water or moisture. Audible and/or visual alarms may be programmed to include a delay, operate for a predetermined amount of time, and can be selectively turned on or off at either the central control unit 110 or from a remote equipment, such as from the alarm annunciator 160.

In addition, as shown in FIG. 1, the central control unit 110 can include a plurality of data input ports 114, 116, and can include a number of output ports 115, 117 to control a number of external devices such as relays, valves, fans or the like. The central control unit 110 can include a control indicator panel 112 having a display for displaying system data, and input interface for programming or operating the central control unit 110. The display may include a number of status indicators that visually show the operative and functional status of the water leak detection system 100. Status indicators may include a plurality of differently colored light emitting diodes, or an LCD display showing phrases, words, characters, symbols, or animations. In some non-limiting examples, the display shows the status of supply voltage to the central control unit 110, status of the backup power source, operative function of address modules 140, 142 and sensors 141, 143, water or moisture alarm signals, internal temperature of the panel 110, operative function of a central monitoring station 110, location data of each sensor 141, 143, diagnostic results, software versions in use, operative status of phone lines, and faulty conditions of devices, just to name a few.

In certain embodiments, the central control unit 110 can further include an input interface or user interface (UI) for programming the central control unit 110. Programming may include inputting data, installing software, running diagnostics, browsing system parameters, providing operating instructions, programming address modules, programming sensors, testing, setting volume of alarms, setting parameters of sensors, etc. The input interface may include input keys, a keyboard, touchpad, a graphical user interface, or any other suitable inputting device. The input interface may include any number of number keys, symbol keys, letter keys, up and down arrows, right or left arrows, or any combination thereof. In alternative embodiments, the input interface can be a software module configured to communicate wireless with a corresponding software module installed in an operator's portable device, such as a smartphone, tablet, laptop computer or the like.

With continued reference to FIG. 1, the central control unit 110 of the present embodiment further includes two telephone line ports that enable monitored system conditions to be remotely communicated over telephone lines indicated as "Line 1" and "Line 2". Alternatively or complementarily, the central control unit 110 can include a remote transceiver and associated software instructions for communicating with a remote device over at least one of a variety of communication system networks including a local area network (LAN), a wide area network (WAN), the Internet, a cable line, a radio channel, an optical communications line, and a satellite communications link. Transmission via the telephone lines and/or the remote transceiver allow the central control unit 110 to transmit information related to sensor detections to remote equipment, in order for appropriate personnel, workers or homeowners to receive voice or text messages of detected conditions.

A speed dial device may be implemented within the central control unit 110 to call preprogrammed numbers to contact appropriate personnel should a water leak be detected. For example, a speed dial device may be used to call a phone, pager, or communicate over a network. One example of a speed dial device includes an auto dialer. Some well-known auto dialers on the market today allow the storage of multiple phone numbers and also provide voice or text messaging storage capabilities for generating text or voice messages. Thus, upon detecting a water leak, the central control unit 110 may activate a speed dialer to contact the appropriate personnel, supervisor, head plumber, or owner using the telephone line and/or radiofrequency transceiver, and transmitting to any of a variety of communication devices such as computers, laptops, pagers, PDA's, telephones, or cellular phones. A variety of communications protocols may be part of the system. Methods of relaying a message may include text messaging, voicemail, prerecorded messages, email, instant messaging, or SMS messaging.

In addition, the central control unit 110 may monitor the integrity of the system to ensure against a failure within the system itself. For instance, the central control unit 110 can monitor the signal interconnectivity to ensure signal integrity is maintained. This ensures the system functions continuously and uninterrupted.

In turn, alarm annunciator 160 in accordance with the invention provides a complete user interface equipment for informing a supervisor or controller of the presence of a water or moisture detection, and where it has taken place. For this purpose, the alarm annunciator comprises a processor unit, a memory including machine-executable instructions to operate the processor unit, and a user interface for providing at least one sensory indication to a person. The alarm annunciator 160 is conveniently installed at a central monitoring station, supervisor's station, a guard's desk, or remote office where an individual can easily view monitored conditions and be informed of the point identification data and the status of each sensor 141, 143.

Figure 2:
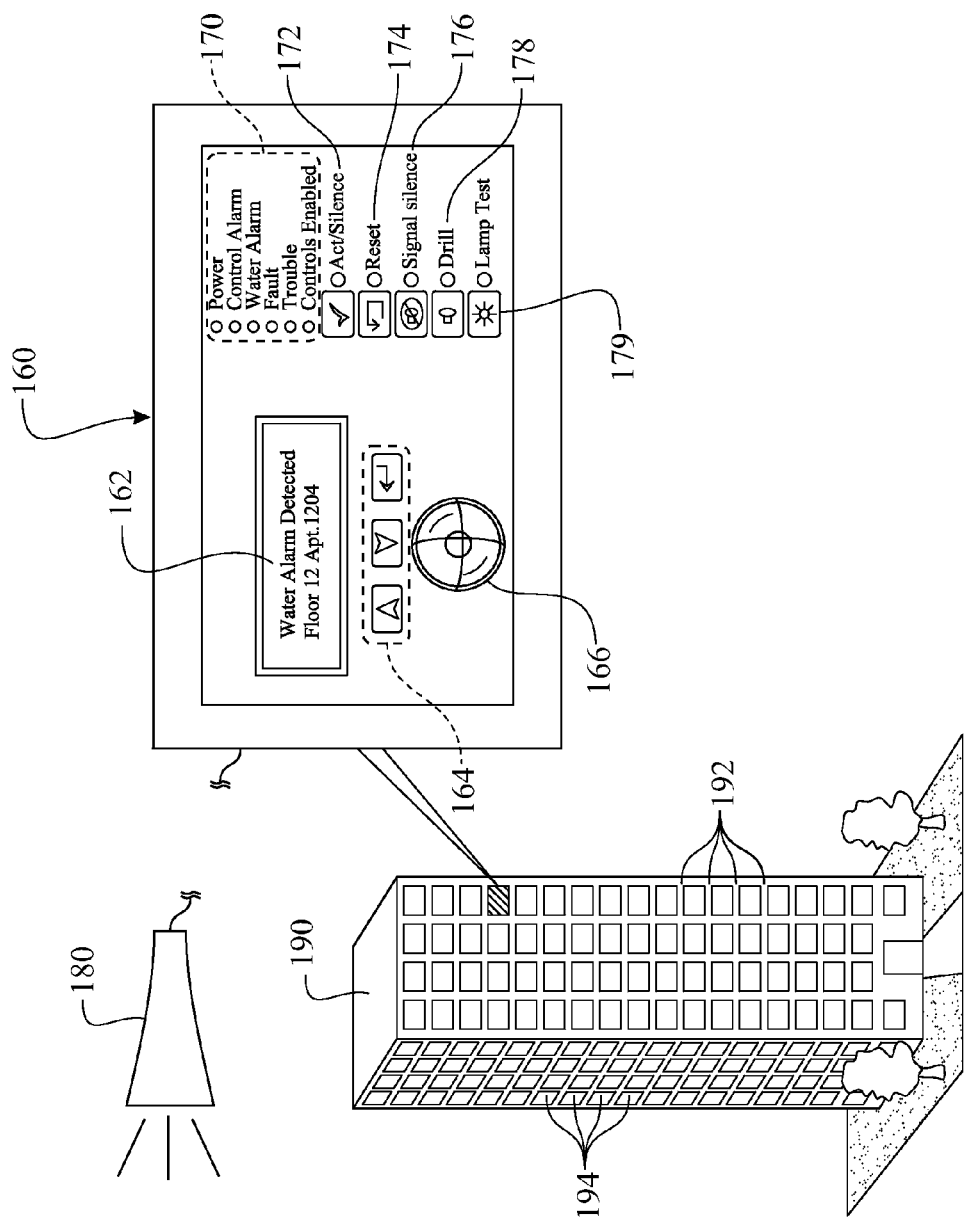
FIG. 2 is a schematic view of a central monitoring station comprising an alarm annunciator, in accordance with the present invention.

As best shown in FIG. 2, the alarm annunciator 160 of the present embodiment includes a user interface comprising a liquid crystal display 162 (LCD) for displaying visual information of a water leak point identification data, and a status indicator section 170 for providing visual information showing the operative status and function of sensors and system parameters. In one non-limiting example, the status indicator section 170 includes a plurality of light emitting diodes (LED). Individual light emitting diodes each provide a visual indication of a system condition or parameter. In one non-limiting example, individual LED's provide visual indications of operative power, a control alarm, a water alarm, a fault in the system, trouble, and whether certain controls are enabled. Similarly, an audible alert 166 can be integrated into the alarm annunciator 160 user interface to provide an audible indication of an alert condition or sensor detection. An exemplary integrated audible alert 166 can be a speaker. The alarm annunciator 160 of the present embodiment further includes selection or input keys for remotely programming the water leak detection system 100. In one example, the alarm annunciator 160 includes an acknowledge or silence key 172 for allowing a remote viewer to acknowledge or silence an alarming monitored condition, a reset key 174 for resetting a particular feature, a signal silence key 176 to silence an audible alarm, a drill key 178 to test system operations, and a lamp test key 179 for testing the operative function of status indicators. The alarm annunciator 160 further includes programmable keys or selection keys 164 that are used for scrolling, selecting, and viewing system point identification data. The alarm annunciator 160 can include relays and/or other associated controls to remotely operate valves, such as either opening or closing a target valve responsively to a water or moisture detection or, alternatively, when desired or deemed necessary.

With continued reference to FIG. 2, a remotely located and operated audible alert 180 can be integrated into the system. An exemplary remotely located and operated audible alert 180 can be a horn, a siren, and the like. The remotely located and operated audible alert 180 is preferably located in an open area, and external to the structure. Alternatively, the remotely located and operated audible alert 180 can be affixed in a location within an interior of the structure providing an audible path wherein the alarm can be heard on an exterior of the building.

In addition, an audible alarm emitter can be provided on site, adjacent or proximate to a sensor, to prevent nearby persons of the water leak. For instance, the occupants of an apartment, to name an example, can hear the audible alarm indicating a sensor has made a positive detection, and quickly take the necessary actions to cease the water leak; such local audible alarm can prevent further damages in the apartment and in other apartments or areas of the building.

Figure 3:
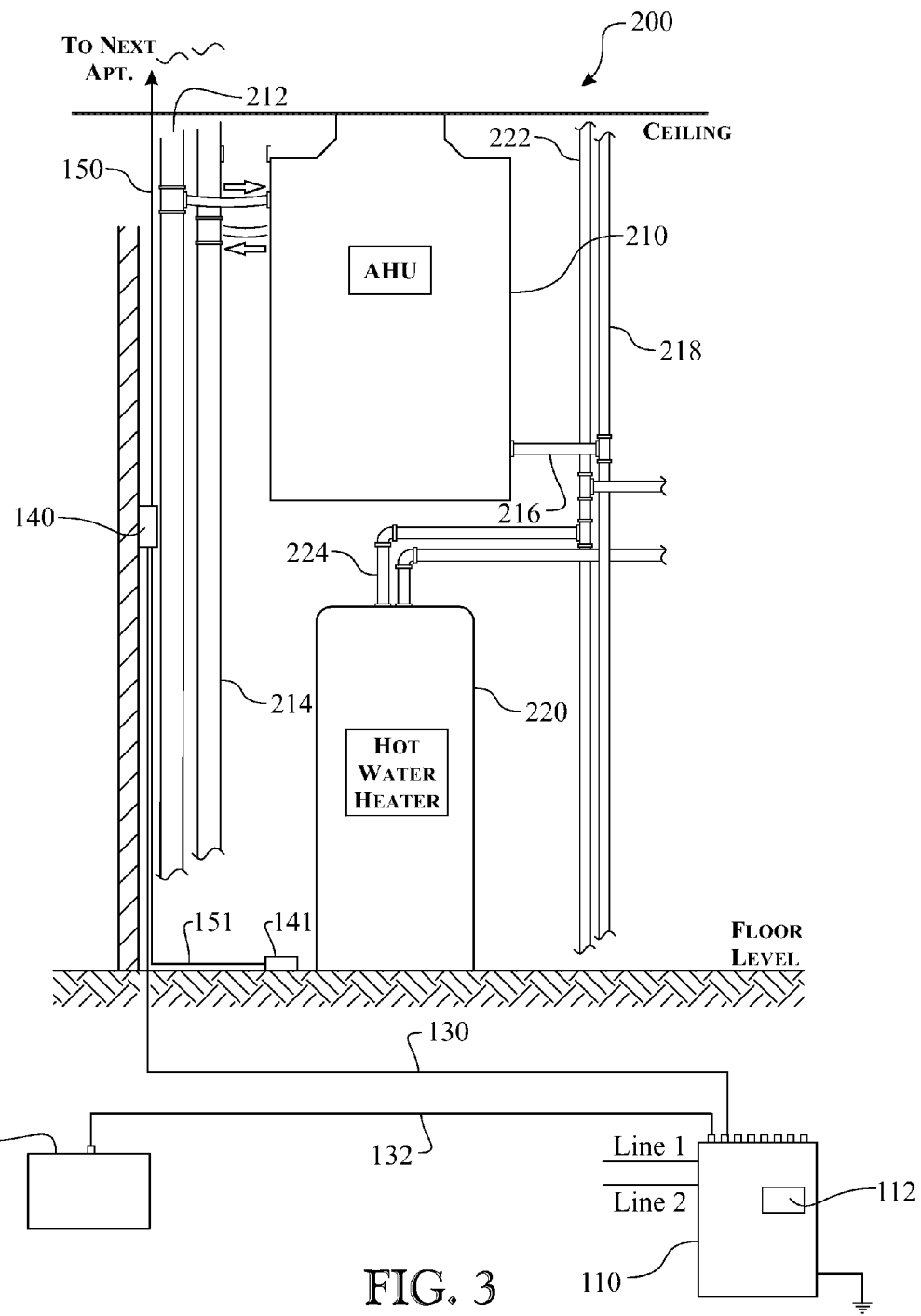
FIG. 3 is a plan view of an exemplary installation of the water leak detection system, in accordance with one embodiment of the present invention.

An exemplary installation and operation sequence is now explained, with reference to FIGS. 2 and 3. As shown in FIG. 2, the exemplary installation is carried out in an eighteen-floor apartment building 190. On one hand, a plurality of sensors 141, 143 have been installed at each floor level 192 of the apartment building 190, in a manner to monitor for any water leaks in general. In addition, a plurality of sensors has been incorporated throughout various areas in a number of different apartments 194 for monitoring and detecting the presence of water or moisture inside the apartments 194. For instance, a water sensor 141 has been installed inside an air conditioning closet 200 such as that of FIG. 3, which is typically included in each apartment 194 for housing an air conditioning and heating unit (AHU) 210 and a water heater tank 220. Operatively coupled to the air conditioning and heating unit 210 and water heater tank 220 is an arrangement of supply or inlet water pipes 212, 222, 224, and draining or outlet water pipes 214, 216, 218. The water sensor 141 is positioned at a lower elevation, generally on the floor level of the air conditioning and heating closet 200, near the water heater 220 and between the pipes 212, 214, 218, 222. An address module 140 is safely enclosed in a junction box, and the module 140 is electrically interfaced between the water sensor 141 and the central control unit 110, via the wired data lines 151, 130. As described earlier, address module 140 is used to assign an identifier or address to each sensor 141. The central control unit 110 is centrally located in a convenient, accessible area within the apartment building 194. Multiple data lines 130 leading from a plurality of water and/or moisture sensors are collectively centralized in one location and operatively connected to the central control unit 110. The central control unit 110 is also connected to a telephone or to a speed dial device, via, telephone line 1 and line 2 to alert a supervisor, plumber, repair service, or management of one or more water leaks. The alarm annunciator 160 is installed at a remote, central monitoring location and is electrically connected to the central control panel 110 via the data line 132, to permit an observer at a central dedicated area to remotely monitor for any water leak conditions within a plurality of air conditioning closets 200. A wired data line 150 extends from the junction box address module 140 and leads to a second address module (not shown) and corresponding sensor, which are operatively positioned within an adjacent air conditioning closet at a second monitoring location. Alternatively, a plurality of address modules may be enclosed in a single junction box where cables lead from each individual address module to each sensor located within a number of closets.

Upon detection of water, sensor 141 transmits a signal to the central control unit 110 via the wired data line 151. The central control unit 110 processes the signal, performs various functions associated with sensor 141, and transmits point identification data to the alarm annunciator 160 via data line 132, to provide a visual and audible identification of a detected water leak. Point identification data includes the detected location of the leak that is associated with the water sensor identifier, and the detected condition status, such as water alarm detected; the point identification data may also include any of the type of sensors 141, 143 used, calibration data of each sensor 141, 143, date and time sensors 141, 143 were activated, date each sensor 141, 143 was placed into service or replaced, diagnostic data of each sensor 141, 143, and/or any other information deemed necessary, useful or desirable about each sensor 141, 143. All or part of the point identification data, including the location of the detecting sensor 141 and information related to the detected condition status, is visually displayed on the display 162 of the alarm annunciator (e.g., "Water Alarm Detected Floor 12 Apt. 1204"). Thus, as shown, a person proximate the alarm annunciator 160 is precisely informed that a water leak has been detected in apartment no. 1204 of the apartment building 190, resulting in an extremely effective and accurate water alarm detected warning. After a predetermined time period, the central control unit 110 sends a messaging signal via telephone lines 1 and 2 to a pager, telephone, auto dialer, PDA, cellular phone, or network to notify appropriate personnel of a water leak. Alternatively or complementarily, the central control unit 110 sends information related to the detection over a cellular network to a remote monitoring center or equipment. Upon proper inspection and repair, the water detection system is reset.

In addition, the central control unit 110 identifies at least one valve associated to said sensor, such as by retrieving information related to the valve from a database stored in a memory of the central control unit 110, where specific sensors are associated to specific valves. The central control unit 110 then sends an operation signal to the at least one remote valve to revert the positive detection by the sensor; for instance, the central control unit 110 can send a valve closing command to cause the valve to restrict water from flowing and thus stop the water leak. For example, the water leak detection system 100 might detect a leak on a specific floor of a structure. The water leak detection system 100 would then identify any potential water source and associated valve(s) contributing to the leak. The water leak detection system 100 subsequently would turn all off the associated valves off. The central control unit 110 may also generate output signals for operating other external devices such as pumps, fans, lights, or any other device that may be helpful in ceasing or fixing a water leak.

The central control unit 110 can also provide a visual and/or audible alarm to alert an operator or supervisor standing in front of or near the central control unit 110 of the water leak.

The central management of a control panel 110 and a remote alarm annunciator 160 provides an efficient water leak detection system for optimum use in virtually any construction or facility, such as, but not limited to, single-story buildings, multi-story buildings, single-building premises, multiple buildings, campuses, commercial facilities, malls, hospitals, city facilities in general, or any other indoor or outdoor construction or location where detecting the presence of water or moisture is desired.

In addition to the sensors 141, 143, a variety of additional sensors may be incorporated to measure and detect other conditions such as, but not limited to, any one of a smoke sensor, a gas sensor, a pressure sensor, a temperature sensor, a thermal sensor, a heat sensor, a water level sensor within a container, a door sensor, a valve status sensor (opened, closed, etc.), an air duct sensor, a fire sensor, or a combination thereof. Different sensors can be used for different applications. For example, water sensors may be used with moisture sensors, or water sensors can be used with temperature sensors. A pressure sensor can be used to monitor the pressure in an air conditioner chiller, in which case a valve, operable by the central control unit 110, can be arranged to cut water feed into the chiller if pressure drops under a predetermined threshold.

It will be appreciated that to facilitate installation, each address module 140 and each sensor 141, 143 may be integrated into one sensor unit device to provide a compact, addressable sensor including integral communication and an addressable point of identification. The use of an integrated addressable sensor reduces the amount of cabling that is needed to electrically connect a plurality of sensors to individual address modules, reduces costs, and saves installation time.

As variations, combinations and modifications may be made in the construction and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but defined in accordance with the foregoing claims appended hereto and their equivalents.

What is claimed is:

1. A water leak detection system deployed within a multistory building, the water leak detection system comprising:
    a central control unit;
    a plurality of address modules provided in electrical communication with said central control unit;
    a plurality of sensors, each of said plurality of sensors provided in electrical communication with a respective address module of said plurality of address modules, wherein each of said plurality of address modules associates an identifier with each respective sensor;
    a multistory building comprising a plurality of floors, wherein at least one sensor is deployed on each floor of said plurality of floors;
    an alarm annunciator provided in signal communication with said central control unit, said alarm annunciator displaying point identification data of each of said plurality of sensors; wherein
    said central control unit stores machine-executable instructions to perform the operations of:
        detecting a signal from an address module, said signal being responsive to a positive detection from the respective sensor;
        waiting for a predetermined time period to pass;
        sending a signal to a remote device to notify said positive detection by said sensor;
        identifying at least one remote valve associated to said sensor; and
        sending an operation signal to said at least one remote valve to revert said positive detection by said sensor.

2. The water leak detection system of claim 1, wherein at least one address module of said plurality of address modules is in electrical communication with said central control unit through a wired data line spanning therebetween.

3. The water leak detection system of claim 1, wherein at least one address module of said plurality of address modules is in wireless electrical communication with said central control unit.

4. The water leak detection system of claim 1, wherein said electrical communication between a sensor and a respective address module is wireless.

5. The water leak detection system of claim 1, wherein said electrical communication between a sensor and a respective address module is provided through a wired data line spanning therebetween.

6. The water leak detection system of claim 1, wherein a sensor and respective address module are integrated within a sensor unit device.

7. The water leak detection system of claim 1, wherein said plurality of sensors includes at least one of a water sensor, a moisture sensor, a floatation sensor and a humidity sensor.

8. The water leak detection system of claim 1, wherein said plurality of sensors includes at least one of a smoke sensor, a gas sensor, a pressure sensor, a temperature sensor, a thermal sensor, a heat sensor, a water level sensor within a container, a door sensor, a valve status sensor, an air duct sensor, and a fire sensor.

9. The water leak detection system of claim 1, wherein said point identification data includes location data of each sensor.

10. The water leak detection system of claim 9, wherein said point identification data includes a monitored condition associated with each sensor.

11. A water leak detection system deployed within a multistory building, the water leak detection system comprising:
    a control unit;
    a plurality of address modules provided in electrical communication with said control unit;
    a plurality of sensors, each of said plurality of sensors provided in electrical communication with an address module, wherein each of said plurality of address modules associates an identifier with each respective sensor;
    a multistory building comprising a plurality of floors, wherein at least one sensor is deployed on each floor of said plurality of floors;
    an alarm annunciator provided in signal communication with said control unit, said alarm annunciator including a user interface for providing sensory indications to a person; wherein
    said control unit stores machine-executable instructions to perform the operations of:
        detecting a signal from an address module, said signal being responsive to a positive detection from a specific respective sensor;
        waiting for a predetermined time period to pass;
        sending an alarm signal to said alarm annunciator to notify said positive detection by said specific respective sensor and provide point identification data of said specific respective sensor, said point identification data comprising data identifying a floor of said plurality of floors in which said specific respective sensor is deployed;
        identifying at least one valve associated to said specific respective sensor; and
        sending an operation signal to said at least one valve to revert said positive detection by said specific respective sensor; and wherein
    said alarm annunciator stores machine-executable instructions to perform the operations of:
        providing a sensory indication via said user interface, said sensory indication communicating said point identification data of said specific respective sensor.

12. The water leak detection system of claim 1 wherein said plurality of sensors includes at least one of a water sensor, a moisture sensor, a floatation sensor and a humidity sensor.

13. The water leak detection system of claim 11, wherein said plurality of sensors includes at least one of a smoke sensor, a gas sensor, a pressure sensor, a temperature sensor, a thermal sensor, a heat sensor, a water level sensor within a container, a door sensor, a valve status sensor, an air duct sensor, and a fire sensor.

14. The water leak detection system of claim 11, wherein said point identification data includes location data of each sensor.

15. The water leak detection system of claim 14, wherein said point identification data includes a monitored condition associated with each sensor.

16. A water leak detection system deployed within a multistory building, the water leak detection system comprising:
a control unit;
a plurality of address modules provided in electrical communication with said control unit;
a plurality of sensors, each of said plurality of sensors provided in electrical communication with an address module, wherein each of said plurality of address modules associates an identifier with each respective sensor;
a multistory building comprising a plurality of floors, wherein at least one sensor is deployed on each floor of said plurality of floors;
an alarm annunciator provided in signal communication with said control unit, said alarm annunciator including a user interface for providing sensory indications to a person; wherein
said control unit stores machine-executable instructions to perform the operations of:
detecting a signal from an address module, said signal being responsive to a positive detection from a specific respective sensor;
waiting for a predetermined time period to pass;
sending an alarm signal to said alarm annunciator to notify said positive detection by said specific respective sensor and provide point identification data of said specific respective sensor, said point identification data comprising data identifying a floor of said plurality of floors in which said specific respective sensor is deployed; and wherein
said alarm annunciator stores machine-executable instructions to perform the operations of:
providing a sensory indication via said user interface, said sensory indication communicating said point identification data of said specific respective sensor;
identifying at least one valve associated to said specific respective sensor; and
sending an operation signal to said at least one valve to revert said positive detection by said specific respective sensor.

17. The water leak detection system of claim 16, wherein said plurality of sensors includes at least one of a water sensor, a moisture sensor, a floatation sensor and a humidity sensor.

18. The water leak detection system of claim 16, wherein said plurality of sensors includes at least one of a smoke sensor, a gas sensor, a pressure sensor, a temperature sensor, a thermal sensor, a heat sensor, a water level sensor within a container, a door sensor, a valve status sensor, an air duct sensor, and a fire sensor.

19. The water leak detection system of claim 16, wherein said point identification data includes location data of each sensor.

20. The water leak detection system of claim 19, wherein said point identification data includes a monitored condition associated with each sensor.

* * * * *